United States Patent [19]

Kurihara et al.

[11] Patent Number: 4,766,544

[45] Date of Patent: Aug. 23, 1988

[54] APPARATUS FOR AUTOMATICALLY CONTROLLING STARTING OF VEHICLE POWERED BY INTERNAL COMBUSTION ENGINE

[75] Inventors: Kazumasa Kurihara, Higashimatsuyama; Kenji Arai, Higashimasyuyama, both of Japan

[73] Assignee: Diesel Kiki Co., Ltd., Tokyo, Japan

[21] Appl. No.: 831,728

[22] Filed: Feb. 21, 1986

[30] Foreign Application Priority Data

Feb. 26, 1985 [JP] Japan ................................ 60-35332

[51] Int. Cl.⁴ .......................................... B60K 41/02
[52] U.S. Cl. ............................... 364/424.1; 192/0.052; 192/3.58; 192/0.032
[58] Field of Search ........................... 364/424, 424.1; 192/0.03, 0.032, 0.033, 0.052, 0.075, 0.076, 3.58; 74/877

[56] References Cited

U.S. PATENT DOCUMENTS

| | | | |
|---|---|---|---|
| 4,343,387 | 8/1982 | Hofbauer | 192/3.58 |
| 4,509,625 | 4/1985 | Tellert | 192/0.052 |
| 4,618,043 | 10/1986 | Hattori et al. | 192/0.052 |
| 4,620,624 | 11/1986 | Mitsui et al. | 192/0.076 |
| 4,662,494 | 5/1987 | Wakiya et al. | 192/0.052 |
| 4,677,880 | 7/1987 | Hattori et al. | 192/0.052 |

FOREIGN PATENT DOCUMENTS

| | | | |
|---|---|---|---|
| 0160731 | 10/1982 | Japan | 192/0.032 |
| 0121343 | 7/1983 | Japan | 192/0.032 |

*Primary Examiner*—Parshotam S. Lall
*Attorney, Agent, or Firm*—James Creighton Wray

[57] ABSTRACT

In an automatic start controlling apparatus for a vehicle having a friction clutch in which the engaging operation of the clutch is automatically carried out in response to the depression of an accelerator pedal in order to carry out the automatic start operation of the vehicle, the apparatus has a first controller for controlling the engine speed in the isochronous control mode in response to the amount of the depression of the accelerator pedal so as to maintain the engine speed at a target speed and a second controller for controlling the engagement of the clutch by controlling the slip rate of the clutch with the passage of time in accordance with a predetermined characteristics, whereby the engine speed is maintained at the target speed during the operation of the engagement of the clutch. As a result, the change in the slip rate of the clutch follows a constant pattern corresponding the characteristics.

7 Claims, 4 Drawing Sheets

APPARATUS FOR AUTOMATICALLY CONTROLLING STARTING OF VEHICLE POWERED BY INTERNAL COMBUSTION ENGINE

BACKGROUND OF THE INVENTION

The present invention relates to a control apparatus for controlling the starting operation of a vehicle powered by an internal combustion engine employing a friction clutch, and more particularly to an apparatus for automatically controlling the starting operation of a vehicle powered by an internal combustion engine which is suitable for automatically controlling the starting operation of a vehicle having an automatic transmission system employing a friction clutch and a gear-type transmission.

There have, for example, been proposed various automatic transmission systems in which hydraulic actuators are connected with a gear-type transmission and a friction clutch so as to be operative in response to electric signals and the operation for shifting the gear-type transmission is carried out in accordance with the operating condition of the vehicle at each instant. If a vehicle having such an automatic transmission system is to be started automatically, it is necessary to control the rate of slip of the clutch in accordance with the engine speed and the amount of the operation of the accelerator pedal so as not to excessively increase in the engine speed.

However, in the conventional apparatus for automatically controlling the start operation, it is very difficult to control the engaging operation of the clutch without excessively increasing the engine speed and impairing the smoothness of the start of the vehicle even in the case where the vehicle load condition at the starting of the vehicle varies so that the amount of the operation of the accelerator pedal varies. Thus, according to the conventional system, it is very difficult to obtain a smooth start of the vehicle regardless of the magnitude of the vehicle load.

SUMMARY OF THE INVENTION

It is an object of the present invention to provide an improved apparatus for automatically controlling the start of vehicle powered by an internal combustion engine.

It is another object of the present invention to provide an apparatus for automatically controlling the start of a vehicle powered by an internal combustion engine, in which the controlling operation for engaging a friction clutch can be carried out easily and smoothly.

It is a further object of the present invention to provide an apparatus for automatically controlling the start of a vehicle powered by an internal combustion engine, wherein smooth starting operation is assured regardless of the variation in the vehicle load.

According to the present invention, in an automatic start controlling apparatus for a vehicle powered by an internal combustion engine having a friction clutch in which the engaging operation of the friction clutch is automatically carried out in response to the depression of an accelerator pedal in order to carry out the automatic start operation of the vehicle, the apparatus comprises means for producing a first signal relating to the amount of depression of the accelerator pedal, a first control means responsive to the first signal for controlling the speed of the engine in the isochronous control mode so as to maintain the speed of the engine at a target speed depending upon the first signal, and a second control means responsive to the first signal for controlling the engagement of the friction clutch by controlling the slip rate of the friction clutch with the passage of time in accordance with characteristics determined on the basis of the first signal.

When the accelerator pedal is depressed, a target engine speed according to the amount of depression of the accelerator pedal is set in the first control means and the speed of the internal combustion engine is controlled in the isochronous control mode so as to be maintained at the target engine speed during the start operation of the vehicle. At the same time, the second control means operates and the clutch is engaged in such a way that the slip rate of the clutch gradually varies from 100 (%) to 0 (%) in accordance with predetermined characteristics, which are a function of at least the amount of depression of the accelerator pedal. As a result, the output rotational speed of the clutch gradually increases.

The speed of the internal combustion engine is maintained at the target engine speed by isochronous control even when the load on the vehicle varies, while the change in the slip rate of the clutch follows a constant pattern corresponding to predetermined characteristics. Thus, the sensation perceived by the vehicle passengers upon starting is always the same regardless of the magnitude of the vehicle load.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
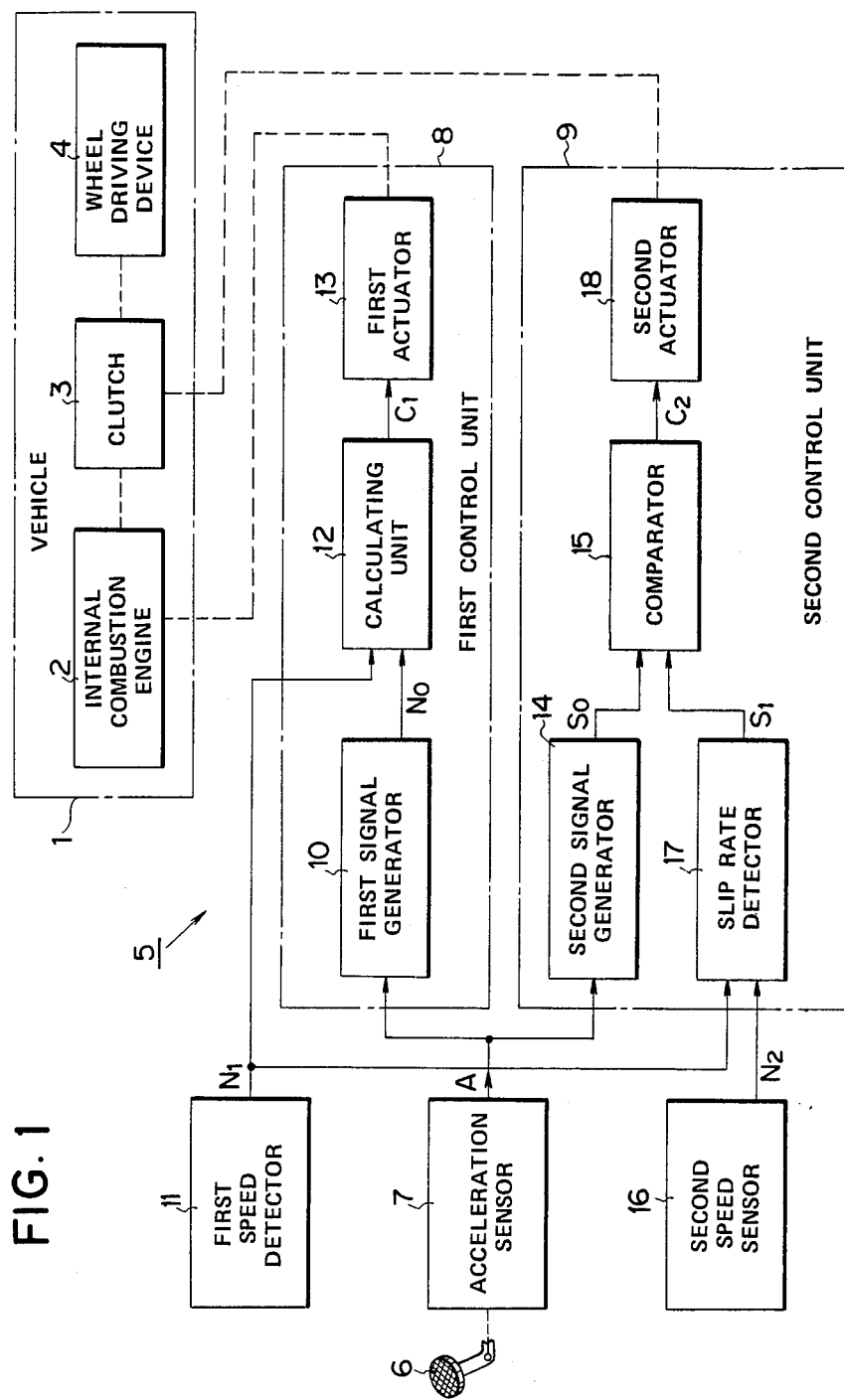
FIG. 1 is a block diagram showing an embodiment of a controlling apparatus for automatically starting a vehicle powered by an internal combustion engine according to the present invention.

FIG. 1 is a block diagram showing an embodiment of an automatic start controlling apparatus according to the present invention, which is for a vehicle powered by an internal combustion engine. Reference number 1 designates a vehicle powered by an internal combustion engine 2 whose output power is transmitted through a friction clutch 3 to a wheel driving device 4. The vehicle 1 is provided with an apparatus 5 for automatically controlling the start of the vehicle 1 powered by the internal combustion engine 2. The apparatus 5 has an acceleration sensor 7 which is connected with an accelerator pedal 6 and produces an acceleration signal A showing the amount of depression of the accelerator pedal 6, a first control unit 8 responsive to the acceleration signal A for controlling the speed of the internal combustion engine 2, and a second control unit 9 responsive to the acceleration signal A for controlling the engaging operation of the clutch 3.

The first control unit 8 has a first signal generator 10 which is responsive to the acceleration signal A and calculates a target engine speed. The target engine speed depends upon the amount $\theta$ of depression of the accelerator pedal 6 and the first signal generator 10 produces a target speed signal $N_o$ representing the result of the calculation. In this embodiment, the target speed signal $N_o$ is applied to a calculating unit 12 to which is also applied a first speed signal $N_1$ produced by a first speed detector 11 and indicating the rotational speed of the input side of the clutch 3.

The calculating unit 12 is responsive to the target signal $N_o$ and first speed signal $N_1$ and carries out a calculation to produce a first control signal $C_1$ for controlling the speed of the internal combustion engine 2 in the isochronous control mode in such a way that the actual engine speed shown by the first speed signal $N_1$ is maintained at the target speed shown by the target speed signal $N_o$. The first control signal $C_1$ is applied to a first actuator 13 for driving a speed regulating member (not shown) of the internal combustion engine 2, for example, a throttle valve.

The second control unit 9 has a second signal generator 14 which is responsive to the acceleration signal A and produces a target slip rate signal $S_o$. The target slip rate signal $S_o$ is a signal showing a target slip rate value which varies from 100 (%) to 0 (%) in accordance with predetermined characteristics with the passage of time after the depression of the accelerator pedal 6, and the target slip rate signal $S_o$ is applied to one input terminal of a comparator 15. A slip rate detector 17 receives the first speed signal $N_1$ and a second speed signal $N_2$ which is produced from a second speed detector 16 for detecting the rotational speed of the output side of the clutch 3 to calculate the slip rate S of the clutch 3. The slip rate S is expressed as $$S = (N_1 - N_2)/N_1$$

A slip rate signal $S_1$ showing the actual slip rate S is applied to another input terminal of the comparator 15, in which the difference between the target slip rate and the actual slip rate is calculated. A signal showing the result of the calculation in the comparator 15 is produced as a second control signal $C_2$, which is applied to a second actuator 18 for carrying out the engaging operation of the clutch 3. The second actuator 18 connected with the clutch 3 is controlled by the second control signal $C_2$ so as to engage the clutch 3 in such a way that the actual slip rate is changed in accordance with the characteristics of the target slip rate.

When the accelerator pedal 6 is depressed, a target engine speed according to the amount of depression of the accelerator pedal 6 is set in the first control unit 8 and the speed of the internal combustion engine is controlled in the isochronous control mode so as to be maintained at the target engine speed during the start operation of the vehicle 1. At the same time, the second control unit 9 operates and the clutch 3 is engaged in such a way that the slip rate of the clutch 3 gradually varies from 100 (%) to 0 (%) in accordance with predetermined characteristics, which may be a function of at least the amount of depression of the accelerator pedal 6. As a result, the output rotational speed of the clutch 3 gradually increases.

The speed of the internal combustion engine 2 is maintained at the target engine speed by isochronous control even when the load on the vehicle 1 varies, while the pattern of change in the slip rate of the clutch 3 follows a constant pattern corresponding to the predetermined characteristics. Thus, the start "feel" of the vehicle is always the same regardless of the magnitude of the vehicle load.

A function similar to that of the first and second control units 8 and 9 shown in FIG. 1 can be attained by another control unit which is constructed by the use of a microprocessor and a memory.

Figure 2:
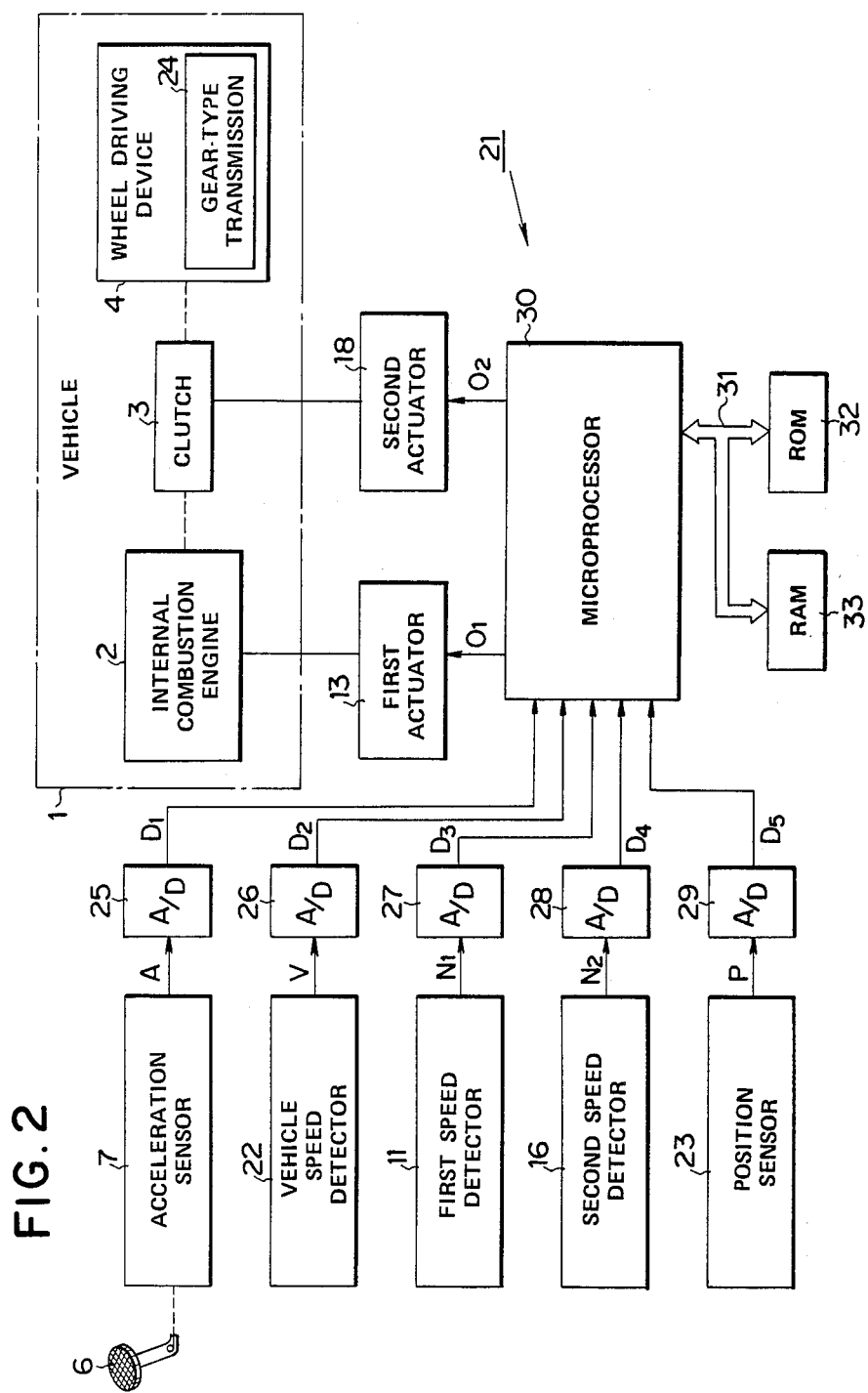
FIG. 2 is a block diagram showing another embodiment of a controlling apparatus according to the present invention.

FIG. 2 shows a block diagram of another embodiment of an automatic start controlling apparatus according to the present invention, which apparatus is constructed by the use of a microprocessor. The automatic start controlling apparatus 21 is an apparatus for automatically operating the start operation of the vehicle 1 powered by an engine in response to the depression of an accelerator pedal. In FIG. 2, the portions corresponding to the portions in FIG. 1 are designated by the same reference numerals as those used in FIG. 1. Reference numeral 22 designates a vehicle speed detector for producing a vehicle speed signal V indicating the actual speed of the vehicle 1, and 23 designates a position sensor which detects the present gear position of a gear-type transmission 24 and produces a position signal P indicating the detected position.

The acceleration signal A, the vehicle speed signal V, the first speed signal $N_1$, the second speed signal $N_2$ and the position signal P are converted into digital form by corresponding analog-digital (A/D) converters 25 through 29 and the digital data $D_1$ through $D_5$ from the respective A/D converters are applied to a microprocessor 30.

A read only memory (ROM) 32 and a random access memory (RAM) 33 are connected through a bus line 31 to the microprocessor 30 and a control program for executing the automatic operation for the start of the vehicle 1 is stored in the ROM 32. The microprocessor 30 is responsive to data $D_1$ to $D_5$ and the controlling calculation is performed in accordance with the control program. The controlling calculation includes a controlling calculation for controlling the speed of the internal combustion engine 2 and another controlling calculation for controlling the engagement of the clutch 3. First and second control signals $O_1$ and $O_2$ based on the respective controlling calculations are produced by the microprocessor 30 and are applied to the first and second actuators 13 and 18, respectively. The performance of the engine speed control based on the first control signal $O_1$ and the slip rate control of the clutch 3 based on the second control signal $O_2$ enables the vehicle 1 to start automatically.

Figure 3:
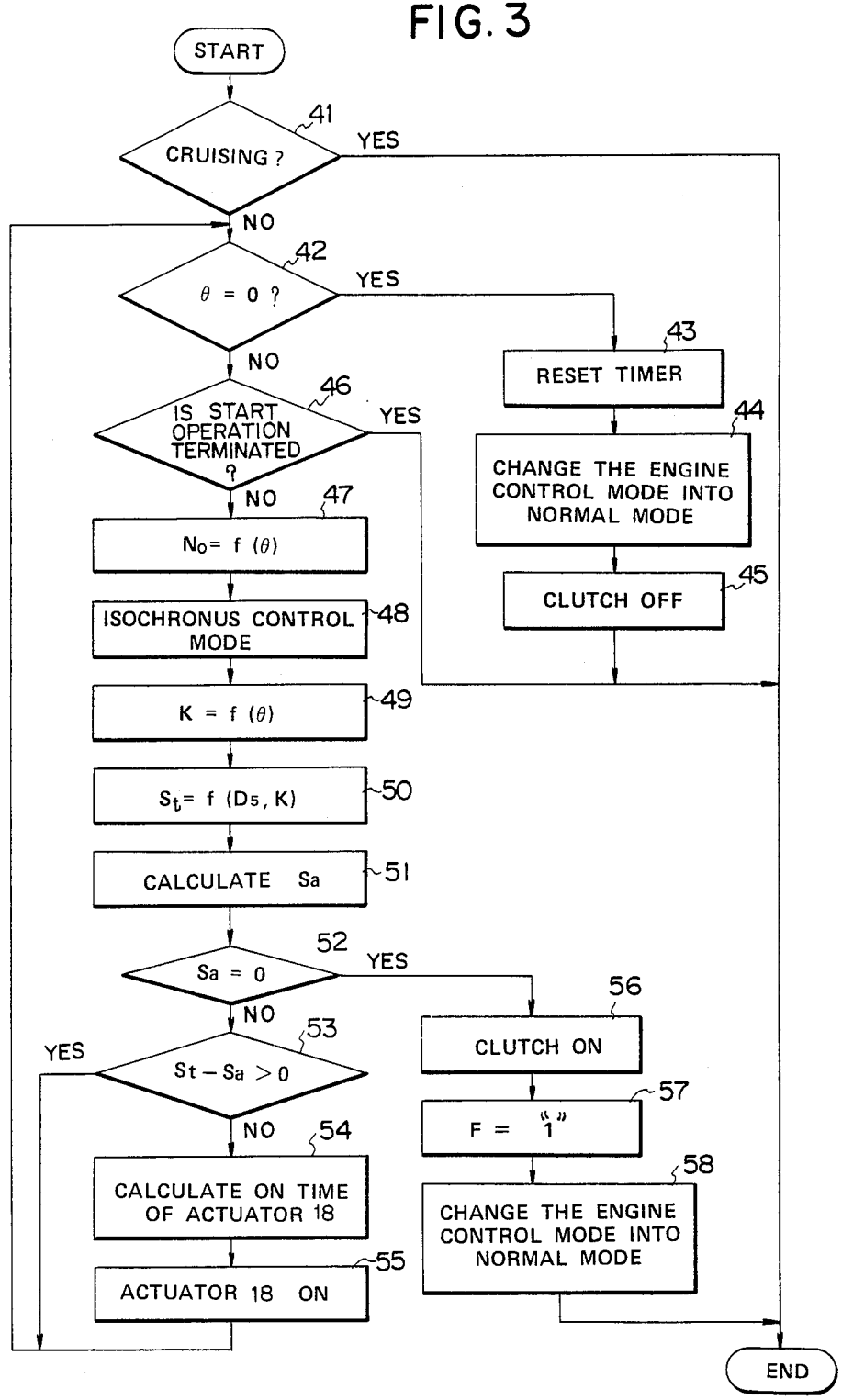
FIG. 3 is a flowchart showing a control program executed in a microprocessor shown in FIG. 2.

The control program executed in the microprocessor 30 will be described in conjunction with a flowchart shown in FIG. 3.

After the start of the execution of the control program, data $D_1$ to $D_5$ are read in and a decision is made in step 41 on the basis of data $D_2$ as to whether the vehicle 1 is now cruising. When the vehicle is cruising, the decision in step 41 is YES, so that the control program is terminated. When the decision in step 41 is NO, the operation moves to step 42 wherein a decision is made on the basis of data $D_1$ as to whether the amount $\theta$ of depression of the accelerator pedal 6 is zero. When the decision in step 42 is YES, the operation moves to step 43 wherein a timer realized by a computer program is reset. After this, in step 44, the operation mode of the internal combustion engine 2 is set in the normal operating mode, i.e. the mode other than that for starting the vehicle, and the operation moves to step 45 wherein the clutch 3 is completely disengaged. The execution of the program is then terminated.

When the decision in step 42 is NO, the operation moves to step 46 wherein a decision is made as to whether the start of the vehicle 1 is completed. The execution of the program is terminated when the start of the vehicle is completed, while the control for starting the vehicle 1 is executed as follows when the start of the vehicle has not been completed yet.

Figure 4:
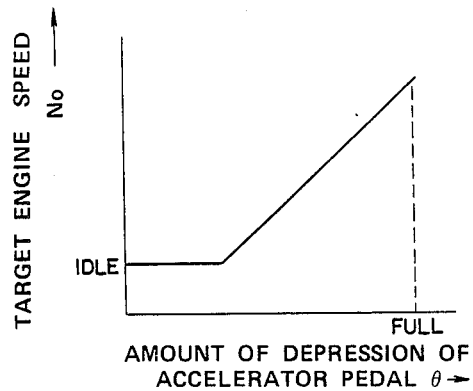
FIGS. 4 through 7 are characteristic curves for explaining the operation of the apparatus shown in FIG. 2.

When the decision in step 46 is NO, the operation moves to step 47 in which a target engine speed $N_o$ is determined in accordance with the amount $\theta$ of depression of the accelerator pedal 6 at that time. FIG. 4 shows the relationship between the target engine speed $N_o$ and the amount $\theta$ of depression of the accelerator pedal 6. After this, the speed of the internal combustion engine 2 is controlled in the isochronous control mode in step 48 and the operation further moves to step 49 in which a correcting coefficient K, which depends upon the amount $\theta$, is calculated on the basis of the map shown in FIG. 5.

After the calculation of the correcting coefficient K, the operation moves to step 50 in which slip rate controlling characteristics indicating how the slip rate S changes with the passage of time during the operation for engaging the clutch 3 are calculated. The target slip rate $S_t$ according to the characteristics is expressed by the following equation $$S_t = F(D_5, K)$$

Figure 5:
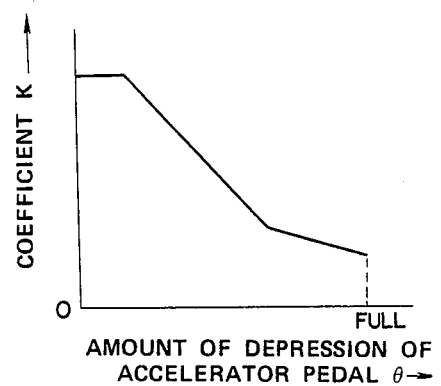
Figure 6:
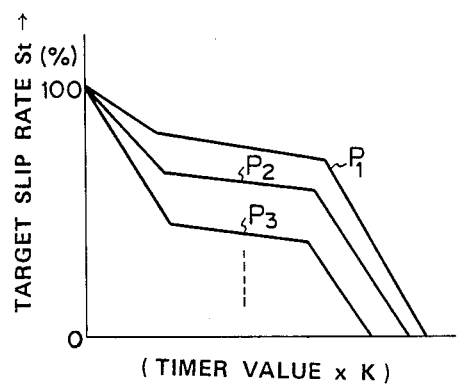

This calculation is carried out in accordance with the map shown by FIG. 5. In FIG. 6, the product of K obtained in step 49 and the total time from the time of the start of the control operation for starting the vehicle 1 measured by a timer which is constructed by a computer program is represented on the x-axis and the slip rate S is represented on the y-axis. In FIG. 6, the gear positions $P_1, P_2, P_3, \ldots$ ($P_1 > P_2 > P_3 > \ldots$) at the start operation are used as parameters, and the slip rate controlling characteristics, that is, the change in the slip rate with the passage of time, depends upon the gear position $P_1, P_2, P_3, \ldots$ The actual slip rate $S_a$ of the clutch 3 is calculated in step 51 on the basis of data $D_3$ and $D_4$ as:

$$S_a = (D_3 - D_4)/D_3$$

In this case, since the speed of the internal combustion engine 2 is controlled in the isochronous control mode, the engine speed is maintained at the target engine speed $N_o$ determined in step 47.

Figure 7:
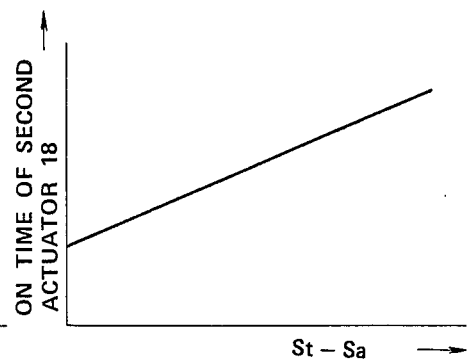

The operation moves to step 52 after the execution of step 51 and a decision is made as to whether or not the actual slip rate $S_a$ obtained in step 51 is zero. When the decision in step 52 is NO, the operation moves to step 53 wherein a decision is made as to whether the target slip rate $S_t$ according to the result obtained in step 50 at that time is more than the actual slip rate $S_a$. When $S_a \leq S_t$, that is, when the clutch plate (not shown) of the clutch 3 is in the proper position or too far in the engaging direction, the operation returns to step 42 without executing the operation for engaging the clutch 3. When $S_a > S_t$, the operation moves to step 54 in which the operating time of the second actuator 18 for engaging the clutch 3 is calculated and determined in accordance with the difference between $S_t$ and $S_a$, and the clutch plate (not shown) is moved in the direction to be engaged in step 55. FIG. 7 shows the relationship between the operating time T of the clutch 3 and the value $(S_t - S_a)$. After this, the operation returns to step 42. Steps 42 and 46 to 55 are repetitively carried out and the clutch 3 is engaged in accordance with the characteristics obtained in step 50. The operation for engaging the clutch 3 is continued until the actual slip rate becomes zero, that is, until the decision in step 52 becomes YES. However, if $\theta$ becomes zero because the accelerator pedal is released in the course of the start operation of the vehicle 1, steps 43 to 45 are carried out to completely disengage the clutch 3, so that the control mode for the internal combustion engine 2 changes from the isochronous control mode into a normal control mode.

When the decision in step 52 is YES due to zero slip state of the clutch 3, the operation moves to step 56 wherein the clutch 3 is completely engaged and a flag F for indicating the termination of the start operation of the vehicle 1 is set in step 57. After this, the operation moves to step 58 wherein the control mode for the internal combustion engine 2 is returned to the normal mode.

In the case where the internal combustion engine 2 is controlled in the isochronous operation mode, the amount of fuel injection is determined on the basis of the difference between the target engine speed and the actual engine speed by means of PI control, whereby the engine speed is controlled so as to maintain the target engine speed. In other words, the engine speed maintains a predetermined constant speed, so that the fuel quantity is changed from zero injection to maximum injection in accordance with the change in the load. On the other hand, in the normal mode for the control of the internal combustion engine, since the fuel quantity is map-calculated on the basis of the depression of the accelerator 6 and the vehicle speed, the engine speed changes in accordance with the load change. Thus, the engine speed depends upon the load in the normal mode for controlling the engine, while the engine speed is maintained at a predetermined constant speed regardless of the change in load in the isochronous control mode.

Therefore, when the accelerator pedal 6 is operated during the start operation of the vehicle 1, the target engine speed for the isochronous control and the correcting coefficient K are dynamically changed, whereby the target slip rate $S_t$ is also changed. Consequently, it is desirable to maintain the amount of depression of the accelerator pedal 6 at a constant level. However, the "feel" at the start operation of the vehicle 1 can be changed by operating the accelerator pedal during the start operation.

As described above, when the accelerator pedal 6 is depressed when the vehicle 1 is stopped, the target slip state characteristics are calculated and the slip rate of the clutch is controlled in accordance with the lapse of time from the beginning of the start operation on the basis of the target slip rate characteristics. The operation for starting the vehicle is completed within a predetermined period. In this case, since the speed of the internal combustion engine 2 is controlled in accordance with the isochronous control mode, the feel at the start of the vehicle 1 is independent of any change in the load on the vehicle 1.

In the embodiment described above, the feel at the start of the vehicle can be varied greatly since the target slip rate characteristics change in accordance with the amount of depression of the accelerator pedal at the start of the vehicle to change the time required from the start of the vehicle starting operation to the termination thereof. As a result, the operator has the impression during the start operation that the vehicle responds well to his depression of the accelerator pedal.

The engaging operation of the clutch 3 is halted in the embodiment described above after the actual slip rate $S_a$ has become less than the target slip rate $S_t$. However, if a highly accurate actuator with high response characteristics is employed as the actuator 18, the clutch 3 may be controlled in such a way that the actual slip rate $S_a$ becomes equal to the target slip rate $S_t$ in this case.

As will be understood from the above description, the present invention is applicable not only to a vehicle powered by a gasoline engine but also to one powered by a diesel engine.

We claim:

1. An apparatus for automatically controlling the start of a vehicle powered by an internal combustion engine adapted to automatically engage a friction clutch in response to the depression of an accelerator pedal, said apparatus comprising:

means for producing a first signal relating to the amount of depression of the accelerator pedal;

a control means responsive to the first signal for controlling the speed of the engine in isochronous control mode so as to maintain the speed of the engine at a target speed set in relation to the first signal;

a gear detecting means for detecting the gear position at which the vehicle starts;

a setting means responsive to the first signal and the output of said gear detecting means for setting target slip rate characteristics indicating the engaging control characteristics;

a slip detecting means for detecting the actual slip rate of said clutch at each instant; and means responsive to the outputs of said setting means and said slip detecting means for controlling the operation for engaging said clutch in such a way that the actual slip rate is changed with the passage of time in accordance with the target slip rate characteristics.

2. An apparatus as claimed in claim 1 wherein said first control means has a first setting means responsive to the first signal for setting the target speed, means for producing a second signal relating to the rotational speed of the engine, and a speed control means responsive to the second signal and the output of said first setting means for controlling the speed of the engine in the isochronous control mode so as to maintain the speed of the engine at the target speed.

3. An apparatus as claimed in claim 2 wherein the target speed set in said first setting means is a function of the first signal.

4. An apparatus as claimed in claim 3 wherein the target speed is set higher as the amount of depression of the accelerator pedal becomes greater.

5. An apparatus as claimed in claim 1 wherein the target slip rate characteristics indicate a target slip rate which varies from 100 (%) to 0 (%) with the passage of time after the execution of the depression of the accelerator pedal for starting the vehicle.

6. An apparatus as claimed in claim 6 wherein the target slip rate is determined in accordance with the first signal.

7. An apparatus as claimed in claim 1 wherein said first detecting means has means for detecting a first speed indicating the rotational speed at an input side of said clutch, means for detecting a second speed indicating the rotational speed at an output side of said clutch, and means responsive to the first and second speed signals for calculating the actual slip rate of said clutch.

* * * * *